3,335,135
PIPERAZINE DERIVATIVES
Tsutomu Irikura, Kuniyasu Masuzawa, and Keigo Nishino, Tokyo, Japan, assignors to Kyorin Seiyaku Kabushiki Kaisha, Tokyo, Japan
No Drawing. Filed July 29, 1965, Ser. No. 475,879
Claims priority, application Japan, July 31, 1964,
39/43,701
3 Claims. (Cl. 260—240)

This invention relates to 1,4-bis-(substituted acetyl)-piperazines and to the preparation thereof. The new piperazine derivatives correspond to the formula

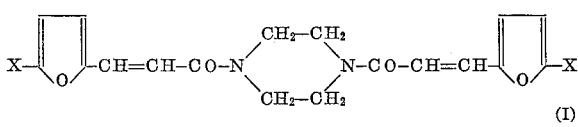

(I)

wherein X is a negative atom, such as Cl, Br or the like, or a negative group of atoms, such as $NO_2$, $SO_3H$ or the like.

1,4-bis-(5-substituted - 2-furylacryl)piperazines of the foregoing formula are novel compounds. They are pharmacologically useful in that they react on the central nervous system; in fact, they exhibit remarkable action as CNS (central nervous system) depressants, as well as analgesic effect and antipyretic effect.

The analgesic effect exhibited by the aforesaid novel compounds of the present invention is more remarkable than that of codeine phosphate, while their antipyretic effect is substantially equal to that of phenacetine and their anti-inflammatory effect is like that of aminopyrine. Notwithstanding the slight solubility in water of the said new compounds, a very small concentration thereof suffices to reach activity level. The new compounds are further characterized by very low toxicity, and, most importantly, habituation and tolerance are now observed. This is satisfactorily demonstrated, for example, by the observation that when 20 mg./kg. (milligrams per kilogram) per day of the respective compounds was administered to a mouse successively for 60 days, the same analgesic effect was shown on the last day as on the first day.

The compounds (I) of this invention are considerably more active than the widely-used salicylates, pyrazolones and acetanilides. The only action exerted by the new compounds are the depressant action on the central nervous system, the antipyretic effect, the analgesic effect and the anti-inflammatory effect; no further action which might interfere with normal routine activity is involved.

The new compounds (I) of the invention are crystalline powders, generally slightly soluble in water and in aqueous solutions of acids and bases, but soluble in hot ethanol, trichloroethane, dioxane and benzene.

The said novel compounds (I) are prepared by the reaction of an acid halide with piperazine or piperazine hexahydrate in a suitable organic solvent, in accordance with the following reaction scheme:

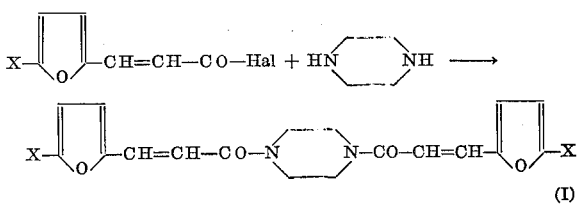

(I)

wherein X is as previously defined and Hal is a halogen atom.

An alternative process, in which an ester is employed, is in accordance with the following scheme:

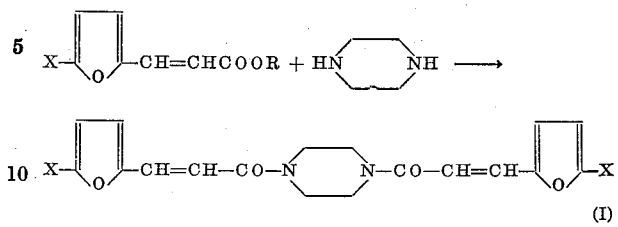

(I)

wherein X is as previously defined and R is lower alkyl.

The new compounds (I) are therapeutically useful, either singly or in admixture with any other medicament which enhances the analgesic effect. The new compounds can be used in tablet form, prepared in per se conventional manner with usual tabletting excipients. They can also be used in powder form; or encapsulated in conventional capsules, e.g. of gelatin; or in a finely dispersed suspension, e.g. aqueous suspension. They may be incorporated into suppositories prepared by mixing the compound (I) with fatty carrier material such as cocoa butter which melts at the body temperature, and molding the mixture into suppository form. They can thus be administered orally or per os. Where the active compound (I) is used with a carrier, a minor proportion of the former relative to the latter is employed. Appropriate dosages will vary from about 10 mg./kg. of body weight per day to about 15 mg./kg. of body weight per day.

Following are presently preferred illustrative, but not limitative, examples of this invention:

Example 1

A solution of 4.04 grams of 5-nitro-2-furylacryl chloride in 20 milliliters of acetone is stirred dropwise into a solution of 1.94 grams of piperazine hexahydrate in 30 milliliters of acetone, at room temperature (about 20 to about 30° C.). Yellow crystals are immediately precipitated. Stirring is continued for 30 minutes, after which the crystals are filtered off and then washed first with water and secondly thoroughly with acetone. The so-obtained yellow crystalline powder—1,4-bis-(5-nitro-2-furylacryl)piperazine—is very slightly soluble in organic solvents; M.P. 330° C. (decomp.). Yield: 93.9% of the theoretical.

Analysis.—Calculated for $C_{18}H_{16}N_4O_8$: N, 13.41%. Found: N, 13.37%.

Example 2

The analgesic effect of e.g. the compound of the formula

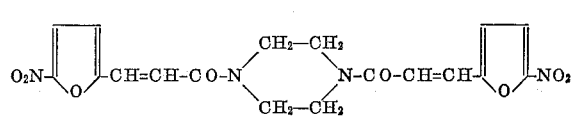

is evaluated from the reaction of a mouse to pressure applied to its tail. The effect, relative to that of codeine phosphate as control, is measured with a group of ten mice, and the efficacy ratio determined by four point assay. The result is shown in the following:

Efficacy ratio [1] _____ 0.921
Confidence limit _____ 0.708–1.146
(Level of significance) ($\alpha = 0.05$).

[1] Relative to that of codeine phosphate assumed to be unity.

What is claimed is:
1. 1,4-bis-(5-substituted-2-furylacryl)piperazine of the formula

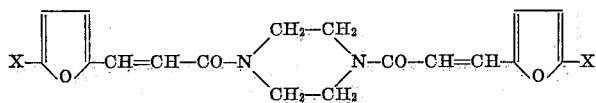

wherein X is a member selected from the group consisting of Cl, Br, NO₂ and SO₃H.

2. 1,4-bis-(5-substituted-2-furylacryl)piperazine of the formula

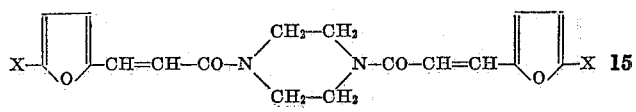

wherein X is a member selected from the group consisting of NO₂ and SO₃H.

3. 1,4-bis-(5-nitro-2-furylacryl)piperazine of the formula

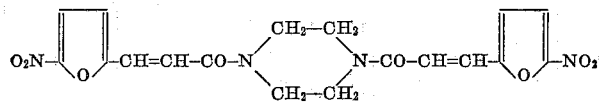

References Cited

UNITED STATES PATENTS

| | | | |
|---|---|---|---|
| 3,031,447 | 4/1962 | Saikachi et al. | 260—240 |
| 3,103,517 | 9/1963 | Prosser | 260—240 |
| 3,139,444 | 6/1964 | Martinez et al. | 260—240 |

JOHN D. RANDOLPH, *Primary Examiner.*